Dec. 7, 1965 E. S. LEE III 3,222,669

DECODER

Filed June 15, 1962 3 Sheets-Sheet 2

| STATES OF INPUT SWITCHES | | | EMITTER POTENTIALS (ARBITRARY UNITS) | | | | | | | | COMMON POINT POTENTIAL (ARBITRARY UNITS) |
|---|---|---|---|---|---|---|---|---|---|---|---|
| $x_3$ | $x_2$ | $x_1$ | $e_{000}$ | $e_{001}$ | $e_{010}$ | $e_{011}$ | $e_{100}$ | $e_{101}$ | $e_{110}$ | $e_{111}$ | $e_C$ |
| 0 | 0 | 0 | 0 | −1 | −1 | −2 | −1 | −2 | −2 | −3 | −3 |
| 0 | 0 | 1 | −1 | 0 | −2 | −1 | −2 | −1 | −3 | −2 | −3 |
| 0 | 1 | 0 | −1 | −2 | 0 | −1 | −2 | −3 | −1 | −2 | −3 |
| 0 | 1 | 1 | −2 | −1 | −1 | 0 | −3 | −2 | −2 | −1 | −3 |
| 1 | 0 | 0 | −1 | −2 | −2 | −3 | 0 | −1 | −1 | −2 | −3 |
| 1 | 0 | 1 | −2 | −1 | −3 | −2 | −1 | 0 | −2 | −1 | −3 |
| 1 | 1 | 0 | −2 | −3 | −1 | −2 | −1 | −2 | 0 | −1 | −3 |
| 1 | 1 | 1 | −3 | −2 | −2 | −1 | −2 | −1 | −1 | 0 | −3 |

FIG. 3

| INPUT STATE | LINE WIRING | |
|---|---|---|
| | 0 | 1 |
| 0 | $+V_d$ | 0 |
| 1 | 0 | $+V_d$ |

FIG. 2

INVENTOR.
EDWIN S. LEE, III
BY Christie, Parker & Hale
ATTORNEYS.

Dec. 7, 1965

E. S. LEE III 3,222,669

DECODER

Filed June 15, 1962

3 Sheets-Sheet 3

United States Patent Office 3,222,669
Patented Dec. 7, 1965

3,222,669
DECODER

Edwin S. Lee III, Altadena, Calif., assignor to Burroughs Corporation, Detroit, Mich., a corporation of Michigan Filed June 15, 1962, Ser. No. 202,787
16 Claims. (Cl. 340—347)

This invention relates to apparatus for converting coded signals from one code to another, and, more particularly, to a decoder employing magnetic core elements to convert a binary code of N bits into a one-out-of K code.

In processing binary coded information in digital computers it is frequently necessary to convert binary coded word information into a discrete pulse signal. For example, such a conversion is generally required in the retrieval of information from a memory storage apparatus wherein information is stored in particular positions within the memory defined by pairs of coordinate signals taking the form of particular binary coded words. In such an instance, to retrieve particular information from the storage the binary coded words denoting the coordinates of position of the information are applied to separate binary decoders. Each decoder is coupled to the storage apparatus by a plurality of output lines each associated with a different coordinate of position within the storage. The binary coded words, upon being applied to the decoders, energize a particular output line of each decoder to excite the coordinate position within the storage apparatus at which the information is stored, thereby instituting the reading of the desired information from the storage apparatus.

Decoders for performing such code translations have in the past taken various forms. A decoder commonly employed in such processes is a decoding matrix formed of diodes or magnetic core elements. Decoders utilizing a diode matrix have the distinct disadvantage of requiring separate pulse amplifying and shaping circuitry in each output line to develop a useable pulse signal, while conventional magnetic core decoding matrices require a large number of magnetic core elements and are thus relatively expensive.

Recent improvements in magnetic core decoder, however, have resulted in decoding matrices which develop relatively high level current pulse signals while employing a minimum number of magnetic core elements.

Such decoding matrices are described in detail in the co-pending patent applications Serial No. 13,194 and Serial No. 13,292, both filed March 7, 1960, and assigned to the same assignee as the present invention and now matured into Patents 3,141,158 and 3,141,159, respectively.

Briefly, the decoding matrix described in the first-mentioned co-pending patent application utilizes a single magnetic core element for each bit of a binary code of N bits and in a two-step process translates a binary coded word into a discrete output current pulse. The decoder described in the second-mentioned co-pending application utilizes a single magnetic core element for each bit of an N bit binary code plus a "bias" core to translate binary code words into discrete output current pulse in a single step.

The decoder of the present invention is a modification of the decoders described in the above-mentioned co-pending patent applications and possesses the advantages of performing code translations in a single step and employing a simplified winding arrangement which requires approximately one-half the input signal energy to develop the same output signal as the decoder of the second-mentioned co-pending patent application. In addition, the decoder arrangement of the present invention automatically detects and corrects for errors in the binary coded word signals applied thereto to continue to provide accurate code translation irrespective of minor coding errors.

Briefly, to accomplish the above, the decoder of the present invention, in a basic form, comprises a plurality of pairs of magnetic core elements. One pair of core elements is associated with each bit of the binary code. Each core element of each core pair, in turn, is associated with a different binary character to define a binary one and a binary zero core element for each bit in the binary code. Coupled to each core element is an input winding and a plurality of separate output windings. The output windings on the binary one cores define binary one output windings while the binary windings on the binary zero cores define binary zero output windings. Coupled between a common terminal and a source of biasing potential are a plurality of output circuits. Each output circuit includes a threshold device and one output winding from each core pair connected in series. The output windings comprising each output circuit are chosen to each define the binary character of a different bit position in a binary word formed by the binary designation of the output windings in each output circuit. The binary word formed in each output circuit differs from the binary word formed in each other output circuit. In the basic form of the present invention the output circuits include all possible binary word combinations of a given number of bits.

Coupled to each input winding and to the common terminal, respectively, are means for pulsing selected input windings which are determined by the particular binary coded word to be translated, and means for simultaneously applying a current pulse to the common terminal.

In the basic form of the decoder, the application of voltage signals to the selected input windings induces like voltage signals in each output winding of the excited cores, thereby developing an output voltage in each output circuit, the largest voltage signal appearing in the output circuit having an output winding on each excited core. A maximum voltage is thus induced only in the output circuit in which a match occurs between the binary word formed therein and the binary coded word being translated. Due to the maximum voltage appearing in a single output circuit, the entire current pulse applied to the common terminal is steered through the single output circuit to provide the desired translation of the binary coded input word.

In order to provide the error detecting and error correcting features of the present invention, the words formed in each output cicuit of a preferred form of the decoder differ in at least two and preferably in three or more bit positions from each other word and voltage detection means are coupled to the common terminal to detect variation in the voltage thereat. If each word differs in at least three bit positions from each other word and if a single bit error occurs in the binary coded input signal, a maximum voltage signal still is developed only in the output circuit in which a match occurs between the word stored therein and the correct binary coded word to be translated. The current pulse, in such a case, is thus steered entirely through the correct output circuit to provide an automatically corrected translation of the erroneous binary coded input word.

In addition, when an error occurs in a binary coded input word the magnitude of the voltage at the common terminal is reduced for each bit error in the binary coded word. Thus, detecting the voltage at the common terminal provides an indication of the number of bit errors in the binary coded input word.

The above, as well as other features of the present invention may be more clearly understood by reference to the following detailed description when considered with the drawings, in which:

FIG. 2 is a chart illustrating the relationship between the voltages developed in the output windings and the binary character of the input applied to the decoder illustrated in FIG. 1;

FIG. 3 is a table representing the potential at the output circuits in FIG. 1 in response to various binary coded input words.

Figure 1:
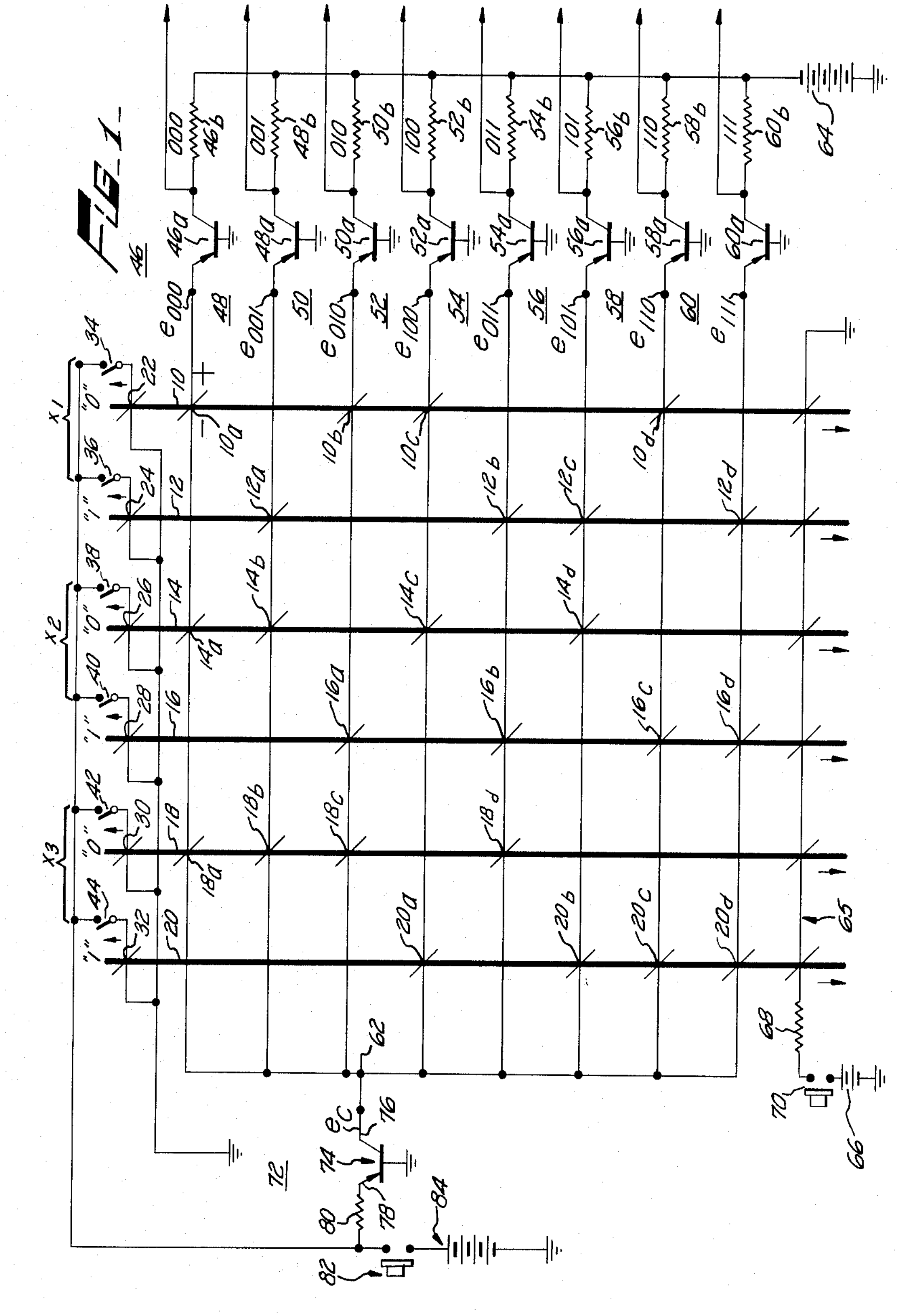
FIG. 1 is a schematic representation of a basic form of the decoder comprising the present invention.

As represented in FIG. 1, the basic form of the present invention is arranged to convert a binary code of N bits into a one-out-of K code wherein $K=2^N$. For example only, the particular decoder illustrated in FIG. 1 is arranged to convert a binary code of three bits into a one-out-of eight code.

The decoder of FIG. 1 is illustrated by conventional "mirror" notation in which each magnetic core is represented by a heavy vertical line and each winding thereon by a horizontal line crossing the core with a diagonal line through the intersection. The polarity of each winding is determined from the direction of the diagonal line. Considering the diagonal line as the edge of the mirror, a beam of light directed at the mirror in the direction of current flow in the winding is reflected by the mirror in the direction of flux produced in the core by the current. Such mirror notation for core windings is well known and is described, for example, at page 196 in Digital Computer Components and Circuits by R. K. Richards, published by D. Van Nostrand Co., Inc. in 1957.

As illustrated, the decoder of the present invention includes a plurality of magnetic core elements 10, 12, 14, 16, and 18. The magnetic core elements are grouped in pairs, each pair being associated with a different bit of the binary code. For example, the core elements 10 and 12 are associated with the first bit of the binary code while the magnetic core elements 18 and 20 are associated with the third bit of the binary code.

Each core element is provided with a single input winding indicated at 22, 24, 26, 28, 30, and 32, respectively. The input windings are coupled in common to a source of reference potential represented as ground. Each input winding is also coupled to a different normally open switch represented at 34, 36, 38, 42, and 44, respectively. The normally open switches are grouped in pairs designated by the letters $X_1$, $X_2$, and $X_3$, one pair of switches being associated with each bit of the binary code to define its binary value. For example, the normally open switches 34, 38, and 42 are provided with a binary zero designation while the normally open switches 36, 40, and 44 are provided with a binary one designation. Depending upon the binary value of each bit of the binary code the normally open switch having the proper associated designation is closed to define the particular binary coded word to be translated in the decoder. For example, if the binary coded word to be translated is the binary word 101, the switches 36, 38, and 44 are closed while if the binary coded word to be translated is 010 the switches 34, 40, and 42 are selectively closed. In this manner, since a separate core element and input winding is associated with each normally open switch, each core element of each core pair is associated with a different binary character of each bit in the binary code to define a binary one and a binary zero core element for each bit in the binary code. Thus, the core elements 10, 14, and 18 may be considered as being binary zero core elements while the core elements 12, 16, and 20 may be considered binary one core elements.

Coupled to each magnetic core element are a plurality of output windings designated by the numeral of the core itself and a sub-letter. For example, the magnetic core element 10 includes output windings $10_a$, $10_b$, $10_c$, and $10_d$ while the magnetic core element 20 has coupled thereto the separate output windings $20_a$, $20_b$, $20_c$, and $20_d$. The output windings on the binary one cores may be designated as binary one output windings while the output windings on the binary zero cores may be represented as binary zero output windings. In addition, the number of turns in each output winding and the number of turns in each input winding are selected to develop voltage signals of equal magnitude and polarity in the output windings in response to voltage signals applied to the input windings.

The decoder illustrated in FIG. 1 also includes eight output circuits designated as 46, 48, 50, 52, 54, 56, 58, and 60. Each output circuit includes a threshold device, a load resistor, and one output winding from each core pair connected in series between a common terminal 62 and a source of biasing potential 64 for the associated theshold device. As illustrated in FIG. 1, the threshold devices are designated by the number associated with the output circuit in which it is included with a sub-letter "*a*" while the associated load resistor is also designated by the number associated with the output circuit and which is included with a sub-letter "*b*." Thus, for example, the output circuit 46 includes a threshold device $46_a$ and a load resistor $46_b$ while the output circuit 60 includes a threshold device $60_a$ and a load resistor $60_b$. The load resistors are of substantially equal value in order to develop like output voltages at an output terminal coupled between the load resistor and its associated threshold device in each ouput circuit.

The threshold device included in each output circuit may be any element or circuit which is normally nonconductive and becomes conductive when a voltage equal to or exceeding a predetermined threshold voltage is applied thereto. By way of example only, the threshold device in each output circuit is represented as being a PNP type transistor arranged in a grounded base configuration with its emitter coupled to the series connected output windings of the decoder and its collector coupled to the load resistor in series with the source of biasing potential 64. In the case of a transistor, the transistor is normally in a non-conductive state. However, when a voltage is developed at the emitter thereof which is slightly positive relative to the potential at the base electrode, the transistor becomes conductive clamping the emitter substantially at ground potential and passing a current signal to its associated load resistor.

In accordance with the present invention, the output windings comprising each output circuit are selectively chosen to each define the binary character of a different bit position in a binary word formed by the binary designation of the output windings in each output circuit. In addition, the binary word formed in each output circuit differs from the binary word formed in each other output circuit such that the output circuits include all possible combinations of binary words of the number of bits in the binary code—in this case three. For example, the output circuit 46 includes the output windings $10_a$, $14_a$, and $18_a$. These windings each have a binary zero designation to define the binary word 000 as indicated above the load resistor $46_b$ in the output circuit 46. The output circuit 48 includes the output windings $12_a$, $14_b$, and $18_b$ to define the binary word 001. Each of the succeeding output circuits 50 through 60 define a different binary word to comprise each possible combination of binary words formed from a three-bit binary code ending with the output circuit 60 including the output windings $12_d$, $16_d$, and $20_d$ to define the word 111.

Coupled to the magnetic core elements of the decoder is a reset circuit represented generally at 65. The reset circuit includes a voltage source 66 and a resistor 68 coupled in series through a normally open push-button switch 70. In addition, the reset circuit 65 includes an output winding on each core element connected in series between the resistor 68 and ground. A momentary closing of the push-button switch 70 allows current to pass through each winding of the reset circuit to ground. Utilizing the mirror notation, the current signal establishes a direction for the residual flux in each core element in a direction indicated by the arrows associated with the reset circuit 65. The reset circuit is utilized and energized after each decoding operation to establish a uniform direction of residual flux in each core element readying the decoder for a new decoding operation.

As previously mentioned, each output circuit is coupled to a common terminal 62. Also coupled to the common terminal 62 is a constant current signal source 72. By way of example only, the current source 72 is illustrated as including a transistor 74 arranged in a grounded base configuration with its collector terminal 76 coupled to the common terminal 62 and its emitter terminal 78 coupled through a biasing resistor 80 and a normally open push-button switch 82 to a voltage source represented by a battery 84. Due to the push-button switch 82 the constant current source 72 may be momentarily and selectively energized to apply a current pulse to the common terminal 62 and hence simultaneously to each output circuit.

The voltage source 84, in addition to being coupled to the transistor 74, also supplies a voltage signal to each of the normally open switches 34 through 44 to provide means for selectively energizing each core element of the decoder array. For example, when the binary coded input signal to be translated into a one-out-of K output code is the binary coded word 000, the switches 34, 38, and 42 are selectively closed. A closing of the push-button switch 82 thus simultaneously applies a current pulse to each output circuit and a voltage signal to the input windings 22, 26, and 30 associated with the core elements 10, 14, and 18, respectively. Current flowing through the input windings of these cores selectively energizes the cores to switch flux in the direction indicated by the arrows associated therewith. In response to the switching of flux in the core elements 10, 14, and 18 a voltage signal of equal magnitude and polarity is developed in each output winding associated with these cores. The momentary closing of the switch 82 does not produce a voltage in any of the output windings associated with the core elements 12, 16, or 20.

The above-described relationship between the voltage developed in each output winding and the character of the binary bit in the binary code with which the output winding is associated is represented in the chart of FIG. 2. Thus, for example, when the state of the bit in the binary coded word to be translated is a zero, a voltage $+V_d$ is developed in the output windings associated with the binary zero core element while no voltage signal is developed in the output windings associated with the binary one core element. The voltage $+V_d$ developed in each output winding of an energized core element is defined as being equal to or greater than the minimum voltage between output lines necessary to steer all current from the constant current source 72 to a particular output circuit. Although the actual value of $V_d$ varies with the magnitude of the current and the characteristics of the threshold device associated with the output circuits, in practice, a voltage of approximately one volt has proven satisfactory.

Since a voltage signal is only induced in the output windings associated with excited magnetic core elements, a voltage signal is only induced in the output circuits including output windings on the selectively energized magnetic core elements. Thus, for example, the output circuit 46 including the output windings $10_a$, $14_a$ and $18_a$ will have a voltage induced therein equal to $3V_d$ volts, while each of the remaining output circuits will have a voltage induced therein equal to $2V_d$ volts or less since each of the output circuits include a lesser number of output windings on the binary zero core element than the output circuit 46. Accordingly, a maximum voltage is developed in a single output circuit which, due to the relationship between the output windings in each output circuit defining different binary coded words, is the output circuit in which a match occurs between the binary coded word formed from the output windings thereof and the binary coded input word as determined by the selective closure of the switches in the switch pairs $X_1$, $X_2$, and $X_3$. Thus, as described, when the binary code is 000, a maximum voltage appears in the output circuit 46. Similarly, it can be shown that when the binary code is of any other value the maximum voltage is developed only in the output circuit in which a match occurs between the binary coded input word and the binary word formed in the output circuit.

Since one of the core elements of each pair of core elements is always selectively energized to define the binary code the maximum voltage developed in the matching output circuit is always equal to $3V_d$. Thus, as in the case of a binary coded input 000, a voltage difference of $3V_d$ volts appears between the emitter designated $e_{000}$ and the common terminal 62, designated $e_c$. Due to the maximum voltage being induced in the output circuit 46, the potential at the emitter of the transistor $46_a$ is equal to and slightly positive relative to the base terminal thereof thus causing the transistor $46_a$ to be conductive and clamping the emitter terminal at a voltage of substantially zero volts. With the emitter voltage $e_{000}$ clamped at substantially zero volts, the voltage at the common terminal $e_c$ is clamped at $-3V_d$ volts. Since only a voltage of $2V_d$ volts or less is induced in each other output circuit, all transistors other than $46_a$ are biased to a non-conductive state and the current pulse from the constant current source 72 is steered entirely through the output circuit 46 to the load resistor $46_b$, thereby effecting a selective conversion of the binary code 000 into the correct one-out-of eight output designation.

In a similar manner it can be shown that for any binary coded input word, as determined by the state of the switches $X_1$, $X_2$, and $X_3$, that a selective steering of the current pulse from the current source 72 through the matching output circuit takes place to provide a selective translation of all possible binary code combinations to the proper and associated one-out-of eight code for the decoder arrangement illustrated in FIG. 1. In such an analysis reference may be made to FIG. 3 which, in short form, represents the emitter potentials for the transistors in each output circuit for every combination of binary coded input words. As represented, for each combination of states of the input switches $X_1$, $X_2$, and $X_3$, only the emitter terminal of the transistor in the matching output circuit is at substantially zero volts to define a conductive state for that transistor and a selective current steering through the associated output circuit.

From the chart of FIG. 3 it is also to be noted that the common point potential $e_c$ remains constant irrespective of the binary code applied to the decoding matrix. This feature of the present invention is particularly useful in the preferred embodiment of the present invention in providing detection and correction for coding errors in the binary coded input words applied to the decoding matrix, as will be described in detail in connection with FIG. 4.

In computer systems, extreme accuracy is required in the conversion of coded information from one code to another. Thus, errors in one or more of the bit positions of a binary code must if at all possible be detected and corrected prior to further processing of the faulty information. The seriousness of this problem may be illustrated by reference to the decoder of FIG. 1. In the decoder of FIG. 1 if an error should occur in one or more bit positions of the binary coded input an erroneous conversion to the one-out-of eight code would occur. For example, if the binary code to be converted was truly 000 and if a one bit error occurred in the third bit position the switches 34, 38, and 44 would be closed and current would be steered through the output circuit 52 rather than through the output circuit 46. Thus, in the retrieval of stored information from a memory storage improper coordinates of position would be energized and improper information would be read from the storage to be processed in the computer further compounding the single bit error in the decoder.

In order to prevent or reduce the chances of such occurrences error detecting and error correcting coding schemes have been devised. Such error detecting and error correcting codes were initially discussed by R. W. Hamming in the April 1950 issue of the Bell System Technical Journal at pages 147 through 160, the subject matter of which is herein incorporated by reference. As described by Mr. Hamming, if each coded word differs in at least one bit position each word is unique. If no errors occur each binary coded word may be readily distinguished from each other binary coded word. However, if a single error should occur in any bit position there is no means for detecting or correcting for such an error. If each coded word differs from each other word in at least two bit positions then an error in a single bit position may be detected and the processing of the information halted. Such a code arrangement, however, is not capable of detecting which coded word is in error but only detecting that an error has occurred. If each coded word in a coding scheme differs from each other coded word in at least three bit positions, not only may a single bit error be detected but it may also be corrected. Applying these teachings to the decoder of the present invention, apparatus is provided for selectively steering a current pulse through a proper output circuit despite an error in one or more bit positions, of the binary code to provide automatic error detection and correction in converting a binary code of N bits into a binary code of one-out-of K. An example of one such decoding arrangement is illustrated in FIG. 4 as providing a code conversion for a binary code of five bits into a one-out-of K code where K is equal to four.

Figure 4:
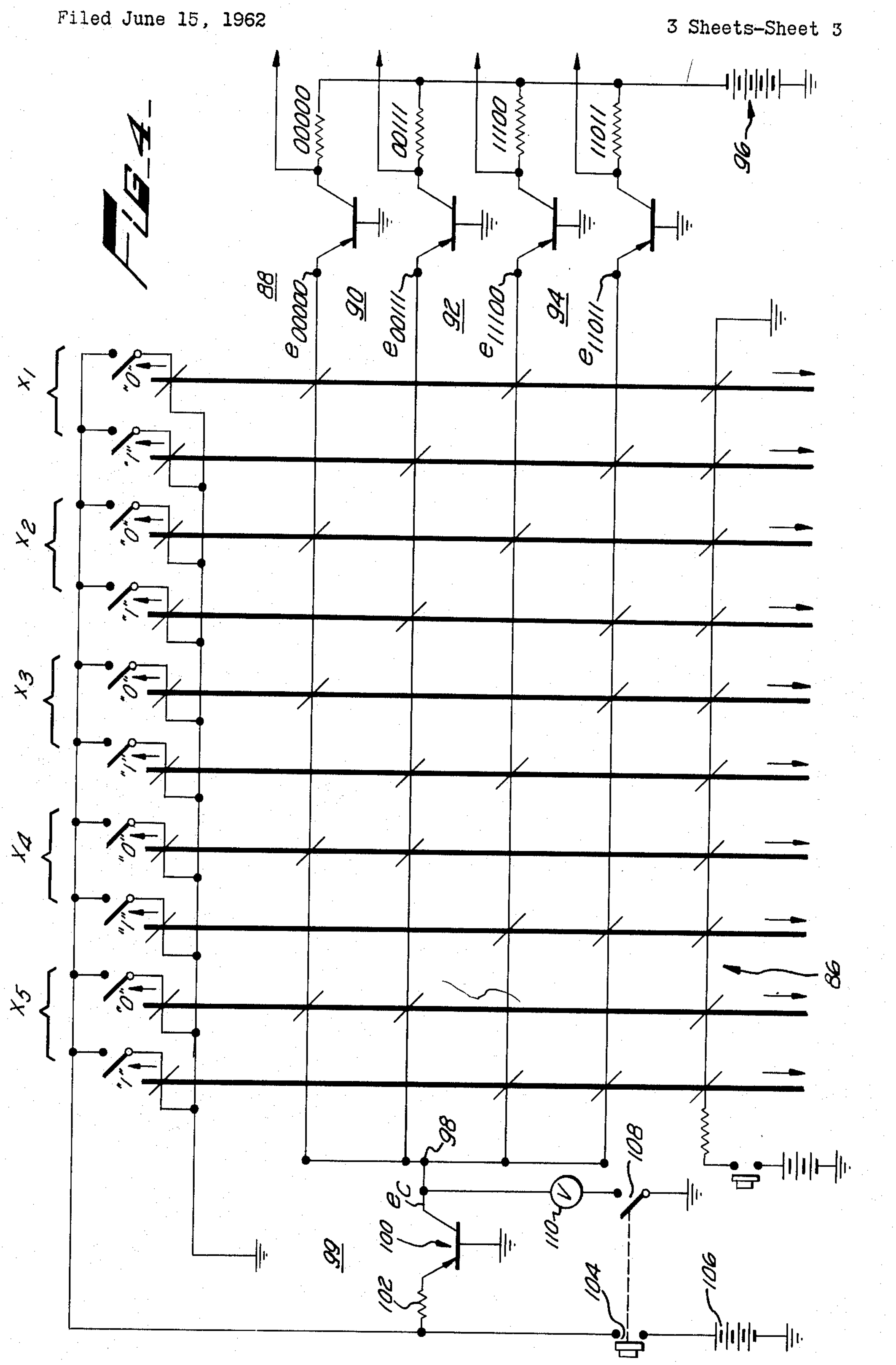
FIG. 4 is a schematic representation of a preferred form of the decoder employing automatic error detecting and correcting features of the present invention.

The decoding arrangement represented at FIG. 4 is very similar to that described in connection with FIG. 1, thus the common elements will be discussed only in general terms. As illustrated, the decoder comprising the preferred form of the present invention includes a plurality of pairs of core elements, one core pair being associated with each bit of a binary code as defined by the selective switch position of a plurality of switch pairs $X_1$, $X_2$, $X_3$, $X_4$, and $X_5$. Each core element of each core pair is associated with a different binary character to define a binary one and a binary zero core element for each bit in the binary code. The decoding arrangement includes a reset circuit 86 substantially similar to the reset circuit 65 described in connection with FIG. 1 to provide means for establishing a like direction for the residual flux in each core element prior to the decoding operation in the decoder arrangement. Also, each magnetic core has associated therewith a separate input winding which is coupled to a different normally open switch and in common to ground, thereby providing means for selectively energizing particular magnetic core elements in accordance with the binary coded word to be translated.

The decoder of FIG. 4 also includes a plurality of output circuits 88, 90, 92, and 94. Each output circuit comprises a plurality of output windings, one from each core pair, a threshold device, and a load resistor connected in series between a source of biasing potential 96 for the associated threshold device and a common terminal 98.

Coupled to the common terminal 98 is a constant current source 99 including a transistor 100 arranged in a grounded base configuration with its collector coupled to the common terminal 98 and its emitter terminal coupled through a resistor 102 to a normally open push-button switch 104. The push-button switch in turn, is coupled in a series circuit relationship to a voltage source represented by a battery 106. The normally open push-button switch 104 is coupled to control a normally open switch 108 which provides a series connection between ground and the common terminal 98 through a voltage detection device represented by the voltmeter 110. The push-button switch 104 also provides a connection for the voltage source 106 to each of the normally open switches defining the binary coded input as described in connection with FIG. 1.

From a five bit binary coded input signal there are thirty-two possible output combinations of words. However, it is only possible to select a group of four of the binary words which differ from each other word in at least three bit positions. Thus only a combination of four of the binary coded words may be utilized to provide means for detecting and correcting for an error in one bit position in the binary coded input word. By way of example only, the four binary coded words utilized in the configuration of FIG. 4 to provide error detecting and correcting for a one bit error in the binary coded input are the binary coded words 00000, 00111, 11100, and 11011. Other combinations of four binary coded words may be chosen.

Utilizing the output winding designations employed in FIG. 1, the output circuit 88 includes only output windings on the binary zero cores to define the binary coded word 00000 in the output circuit 88. Similarly, the output circuit 90 includes output windings on the binary zero cores for the binary bit positions defined by the switches $X_5$ and $X_4$ and output windings on the binary one cores for the bits of the binary code defined by the switches $X_3$, $X_2$, and $X_1$, thereby defining the binary word 00111 in the output circuit 90 as illustrated.

Following the operational description utilized in connection with FIG. 1, if the binary coded word to be translated is any one of the binary coded words included in the output circuits 88 through 94 the current pulse from the source 99 will be steered only through the matching output circuit. However, in accordance with the error correcting decoder arrangement of FIG. 4, if an error occurs in one bit position of the five bit binary coded input word the current signal applied to the common terminal 98 will be steered through the output circuit having the fewest number of mismatching bit positions to automatically provide a corrected code translation. For example, if the binary coded input signal to be translated were actually 00111 but an error occurred in the second bit position and the binary coded input, as defined by the selective closing of the normally open switches, were 00101, a closing of the push-button switch 104 would selectively energize the zero cores associated with the second, fourth, and fifth bits of the binary coded word and the one cores associated with the first and third bits of the binary coded word, an error thus appearing in the second bit position. In response to the energizing of the selected magnetic core elements, voltage signals of like amplitude and polarity are induced in each output winding associated with an excited core element. Thus, a voltage of $3V_d$ is induced in the output circuit 88, a voltage of $4V_d$ volts in the output circuit 90, a voltage of $2V_d$ volts in the output circuit 92, and a voltage of $2V_d$ volts in the output circuit 94. Accordingly, even though a one bit error occurs in the binary coded input a maximum voltage of $4V_d$ volts appears in the properly corresponding output circuit 90. Since a voltage difference of $V_d$ or more appears between the output circuit 90 and each of the other output circuits the current pulse from the current source 99 is steered entirely through the output circuit 90 to provide a proper code translation for the binary coded input. Thus, employing an arrangement of binary coded words in the output circuits which differ from each other in at least three bit positions, a decoder is formed in accordance with the present invention which automatically corrects for errors in the binary coded input in one bit position.

The teachings of R. W. Hamming may be expanded to provide a decoding arrangement in accordance with the present invention which will correct for two or more errors by increasing the number of bit positions in which a difference must occur between each word in the decoding array. Thus, for example, if it is desired to correct for an error in two bit positions each word formed in the output circuits must differ from each other word in five bit positions. Although such an error correcting scheme is of little use in the conversion of binary coded words having a small number of bits it is extremely useful when large words are to be decoded with a high degree of accuracy.

The decoder of FIG. 4, in addition to providing means for automatically correcting for errors in the binary coded input, also provides means for automatically detecting the number of errors appearing in the binary coded input. As described, if no error occurs in the binary coded input each of the proper core elements are energized to selectively induce a voltage signal in each of the output windings associated therewith. In such a case in a five bit binary coded input a five unit difference exists between the voltage at the emitter of the transistor in the output circuit in which a match occurs and the common terminal 98. Thus, upon the closing of the push-button switch 104 and the normally open switch 108 a voltage of five units is detected by the voltmeter 110. However, in the case of a one bit error in the binary coded input word, only a four unit difference existed between the threshold device in the truly matching output circuit and the common terminal 98. Thus, when the switch 108 is closed a voltage of four units is detected by the voltmeter 110 to provide an indication of a one bit error. In a similar manner it can be shown that if a two bit error occurs in the binary coded input the voltage at the common terminal has a magnitude of $3V_d$ volts indicative of a two bit error in the binary coded input. Thus, by selectively strobing the voltage at the common terminal 98 in synchronism with the application of the current pulse to the common terminal, means are provided for detecting the number of bit positions in the binary coded input in which a coding error occurred.

Accordingly, as described, the preferred form of the present invention illustrated in FIG. 4 provides means for both automatically correcting and detecting for errors in the binary coded input to maintain an accurate code conversion between a binary code of N bits to a code of one-out-of K where K is determined by the number of bit errors for which it is desired to automatically detect and correct.

Although the input and driving circuit arrangement of the decoders in FIGS. 1 and 4 have been described utilizing manually controllable switches, it is to be understood that electronic switching devices may be substituted therefor without departing from the scope of the present invention. For example, in place of the normally open switches associated with each input winding a normally non-conductive transistor may be utilized which is controlled by current pulses applied to its base terminal. In a similar manner other electronic circuitry may be substituted for the push-button switches 70, 82, and 104 to provide a completely electronically controllable decoding arrangement.

What is claimed is:

1. A decoder for converting a binary code of N bits into a one-out-of K code, comprising:

N pair of magnetic core elements, a pair of core elements being associated with each bit of the binary code and each core element of each core pair being associated with a different binary character to define a binary one and a binary zero core element for each bit in the binary code;

an input winding on each core element;

a plurality of separate output windings on each core element, the output windings on the binary one cores defining binary one output windings and the output windings on the binary zero cores defining binary zero output windings;

K output circuits each including a normally non-conductive threshold switching device and one output winding from each core pair connected in series between a common terminal and a source of biasing potential for its associated threshold device, the output windings comprising each output circuit being chosen to define the binary character of a different bit position in a binary coded word formed by the binary designation of the output windings in each output circuit, the output windings comprising each output circuit being selected to define a binary word in each output circuit which differs from the words formed in each other output circuit;

means for pulsing selected input windings to define a binary coded input word of N bits to be translated;

and means for applying a current pulse to the common terminal during the pulsing of the selected input windings whereby the current pulse is steered to one of the threshold devices for switching it to a conductive condition and thereby signal the one-out-of K conversion.

2. A binary code converter, comprising:

a plurality of pairs of magnetic core elements, a pair of core elements being associated with each bit of the binary code;

an input winding on each core element;

a plurality of output windings on each core element, the number of turns in each output winding and the number of turns in each input winding being selected to develop voltage signals of substantially equal magnitude and polarity in the output windings in response to voltage signals applied to the input windings;

a plurality of output circuits each including a normally non-conductive threshold switching device and an output winding on one core element of each pair of core elements connected in series;

and means for simultaneously pulsing each output circuit and for pulsing selected input windings whereby one of the threshold devices is switched to a conductive condition and thereby signals the one-out-of K conversion.

3. A binary code converter, comprising:

a plurality of pairs of magnetic core elements, a pair of core elements being associated with each bit of the binary code;

an input winding on each core element;

a plurality of output windings on each core element, the number of turns in each output winding and the number of turns in each input winding being selected to develop voltage signals of equal magnitude and polarity in the output windings in response to voltage signals applied to the input windings;

a plurality of output circuits each including a normally non-conductive threshold switching device and an output winding from one core element of each pair of core elements connected in series;

means for momentarily applying a voltage signal to selected input windings;

and means for momentarily applying a current signal to each output circuit substantially simultaneous with the momentary application of the voltage signal to the selected input windings whereby the current signal is coupled to one of the threshold devices for switching it to a conductive condition to signal the one-out-of K conversion.

4. A decoder for converting a binary code of N bits into a one-out-of K code, comprising:

N pair of magnetic core elements;

an input winding on each core element;

a plurality of separate output windings on each core element, the number of turns in each output winding and the number of turns in each input winding being selected to develop voltage signals of equal magnitude and polarity in the output windings in response to voltage signals applied to the input winding;

K output circuits each including a normally non-conductive threshold switching device and an output winding on one core element of each pair of core elements connected in series;

means for momentarily applying a voltage signal to selected input windings;

a constant current source;

and means for momentarily energizing the constant current source to apply a current pulse to each output circuit simultaneous with the momentary application of the voltage signal to the selected input windings whereby the current pulse is coupled to one of the threshold devices for switching it to a conductive condition and thereby signal the conversion.

5. The apparatus defined in claim 4 wherein each output circuit includes a load resistor connected in series between the output circuit for a threshold switching device and a source of biasing potential for the threshold switching device.

6. A decoder for converting a binary code of N bits into a one-out-of K code, comprising:

N pair of magnetic core elements;

an input winding on each core element;

a plurality of output windings on each core element, the number of turns in each output winding and the number of turns in each input winding being selected to develop voltage signals of equal magnitude and polarity in the output windings in response to voltage signals applied to the input windings;

K output circuits each including a normally non-conductive threshold switching device and an output winding on one core element of each pair of core elements connected in series between a common terminal and a source of biasing potential for the threshold device;

means for momentarily applying a voltage signal to selected input windings;

a constant current source coupled to the common terminal;

means for momentarily energizing the constant current source to apply a current signal to each output circuit simultaneous with the application of the voltage signal to the selected input windings whereby the current signal is coupled to one of the threshold devices for switching it to a conductive condition to thereby signal the conversion;

and means for detecting the voltage at the common terminal in synchronism with the energizing of the constant current source.

7. A decoder for converting a binary coded input signal of N bits into a one-out-of K code, comprising:

N pair of magnetic core elements;

an input winding on each core element;

means for setting the residual flux in the same direction in all core elements;

means responsive to the binary coded signal for simultaneously pulsing selected input windings to reverse the direction of the residual flux in selected core elements;

a plurality of output windings on each core element;

K output circuits each including a normally non-conductive threshold switching device and an output winding on one core element of each pair of core elements connected in series, each output circuit being connected between a common terminal and a source of biasing potential for its associated threshold device;

and means for momentarily applying a current signal to the common terminal simultaneous to the pulsing of the input windings whereby the current signal is coupled for rendering one of the threshold devices conductive to thereby signal the conversion;

8. The apparatus defined in claim 7 wherein the means for applying a current signal to the common terminal includes a constant current source and means for momentarily energizing the constant current source.

9. A decoder for converting a binary coded input signal of N bits into a one-out-of K code, comprising:

N pair of magnetic core elements;

an input winding on each core element;

a plurality of output windings on each core element, the number of turns in each output winding and the number of turns in each input winding being selected to develop voltage signals of equal magnitude and polarity in the output windings in response to voltage signals applied to the input windings;

means for setting the residual flux in the same direction in all core elements;

means responsive to the binary coded input signal for momentarily applying a voltage signal to selected input windings to reverse the direction of the residual flux in one core element of each pair of core elements thereby producing voltage signals in the output windings of selected core elements;

K output circuits each including a normally non-conductive threshold switching device and an output winding on one core element of each pair of core elements connected in series between a common terminal and a source of biasing potential for the threshold device;

a constant current source coupled to the common terminal;

and means for momentarily energizing the constant current source simultaneously with the application of the voltage signals to the selected input windings whereby one of the switching devices is switched to a conductive condition to signal the conversion.

10. The apparatus defined in claim 9 including means for detecting the voltage at the common terminal in synchronism with the energizing of the constant current source.

11. A decoder for converting a binary code of N bits into a one-out-of K code, comprising:

a plurality of magnetic core elements, at least one core element being associated with each bit of the binary code;

an input winding on each core element;

a plurality of separate output windings on each core element;

a plurality of output circuits each including a normally non-conductive threshold switching device and at least one output winding connected in series, the output windings and the number thereof in each output circuit being chosen to each define a preselected binary character thereby forming a preselected binary word in each output circuit, each binary word differing from each other binary word in at least two bit positions;

and means for simultaneously pulsing each output circuit and for pulsing selected input windings whereby one of the switching devices is switched to a conductive condition to signal the conversion.

12. A decoder for converting a binary code of N bits into a one-out-of K code, comprising:

a plurality of pairs of magnetic core elements, a pair of core elements being associated with each bit of the binary code and each core of each core pair being associated with a different binary character to define a binary one and a binary zero core element for each bit in the binary code;

an input winding on each core element;

a plurality of separate output windings on each core element, the output windings on the binary one cores defining binary one output windings and the output windings on the binary zero cores defining binary zero output windings;

a plurality of output circuits each including a normally non-conductive threshold switching device in one output winding from each core pair connected in series, the output windings comprising each output circuit being chosen to each define a binary character of a different bit position in a binary word formed by the binary designation of the output windings in each output circuit, the output windings comprising each output circuit also being selected to define a binary word in each output circuit which differs in at least two bit positions from the words formed in each other output circuit;

and means for simultaneously pulsing each output circuit and for pulsing selected input windings whereby one of the switching devices is switched to a conductive condition to signal the conversion.

13. A decoder for converting a binary code of N bits into a one-out-of K code, comprising:

N pair of magnetic core elements, a pair of core elements being associated with each bit of the binary code and each core element of each core pair being associated with a different binary character to define a binary one and a binary zero core element for each bit in the binary code;

an input winding on each core element;

a plurality of separate output windings on each core element, the output windings on the binary one cores defining binary one output windings and the output windings on the binary zero cores defining binary zero output windings, the number of turns in each output winding and the number of turns in each input winding being selected to develop voltage signals of equal magnitude and polarity in the output windings in response to voltage signals applied to the input windings;

K output circuits each including a normally non-conductive threshold switching device and one output winding from each core pair connected in series between a common point and a source of biasing potential for its associated threshold device, the output windings comprising each output circuit being chosen to each define a binary character of a different bit position in a binary word formed by the binary designation of the output windings in each output circuit, the output windings comprising each output circuit also being selected to define a binary word in each output circuit which differs in at least two bit positions from the words formed in each other output circuit;

means for momentarily applying a voltage signal to selected input windings, one associated with each core pair to define a binary coded input signal of N bits;

and means for momentarily applying a current pulse to the common terminal substantially simultaneous with the application of the voltage signals to the selected input windings.

14. The apparatus defined in claim 13 including means for detecting the voltage at the common terminal.

15. The apparatus defined in claim 13 including means for resetting the direction of flux in each core element.

16. A decoder for converting a binary code of N bits into a one-out-of K code, comprising:

a plurality of input circuits, a pair of input circuits being associated with each bit position in the binary code and each input circuit of each pair being associated with a different binary character to define a binary one input circuit and a binary zero input circuit for each bit in the binary code;

a plurality of bistable storage elements coupled to each input circuit, the bistable elements coupled to the binary one circuits defining binary one bistable elements and the bistable elements coupled to the binary zero input circuits defining binary zero bistable elements, each bistable element being characterized by developing a voltage signal of a predetermined magnitude and polarity during switching from a first stable state to a second stable state in response to the pulsing of its associated input circuit;

means coupled to each input circuit for initially placing each bistable element in its first stable state;

a plurality of output circuits, each output circuit including a normally non-conductive threshold switching device and a plurality of bistable elements connected in series, the bistable elements comprising each output circuit being selected to each define the binary character of a different bit position in a binary word formed by the binary designation of the bistable elements in each output circuit, the bistable elements comprising each output circuit also being selected to define a binary word in each output circuit which differs in at least one bit position from the word formed in each other output circuit;

means for momentarily pulsing selected input circuits, one associated with each bit of the binary code to define a binary coded input word of N bits to be translated;

and means for momentarily applying a current pulse to each output circuit substantially simultaneous with the pulsing of the selected input circuits whereby one of the threshold devices is switched to a conductive condition and signals the conversion.

References Cited by the Examiner

UNITED STATES PATENTS

| | | | |
|---|---|---|---|
| 2,846,671 | 8/1958 | Yetter | 340—347 |
| 2,931,022 | 3/1960 | Triest | 340—347 |
| 3,011,165 | 11/1961 | Angel et al. | 340—347 |
| 3,024,454 | 3/1962 | Chaimowicy | 340—347 |

MALCOLM A. MORRISON, *Primary Examiner.*